United States Patent
Sun et al.

(10) Patent No.: US 11,638,248 B2
(45) Date of Patent: Apr. 25, 2023

(54) CHANNEL OCCUPANCY TIME-STRUCTURE INFORMATION INDICATION FOR NEW RADIO-UNLICENSED SIDELINK

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Gene Wesley Marsh, San Diego, CA (US); Shailesh Patil, San Diego, CA (US); Juan Montojo, San Diego, CA (US); Ozcan Ozturk, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/162,257

(22) Filed: Jan. 29, 2021

(65) Prior Publication Data
US 2022/0248384 A1  Aug. 4, 2022

(51) Int. Cl.
*H04W 72/04* (2009.01)
*H04W 74/08* (2009.01)
*H04W 72/044* (2023.01)

(52) U.S. Cl.
CPC ..... *H04W 72/044* (2013.01); *H04W 74/0808* (2013.01)

(58) Field of Classification Search
CPC .......... H04W 72/0446; H04W 72/042; H04W 72/1257; H04W 72/1289; H04W 72/044; H04W 74/0808
See application file for complete search history.

(56) References Cited

U.S. PATENT DOCUMENTS

| | | | | |
|---|---|---|---|---|
| 2020/0281015 A1* | 9/2020 | Li | ...................... | H04W 72/0453 |
| 2020/0314899 A1* | 10/2020 | Sun | ................... | H04W 72/1268 |
| 2020/0314902 A1* | 10/2020 | Sun | ................... | H04W 72/0446 |
| 2021/0368351 A1* | 11/2021 | Cui | ........................ | H04W 16/14 |
| 2022/0078845 A1 | 3/2022 | Xu et al. | | |
| 2022/0141872 A1* | 5/2022 | Wang | ............... | H04W 74/0841 |
| | | | | 370/329 |

FOREIGN PATENT DOCUMENTS

| WO | WO-2020024854 A1 | 2/2020 |
| WO | WO-2020164439 A1 | 8/2020 |

OTHER PUBLICATIONS

International Search Report and Written Opinion—PCT/US2022/014096—ISA/EPO—dated May 11, 2022.

* cited by examiner

*Primary Examiner* — Rasheed Gidado

(57) ABSTRACT

Improved communications, including indication of channel occupancy time-structure information (COT-SI) for NR-U sidelink (NR-U SL) operations is disclosed. A UE may establish a current channel occupancy time (COT) on a shared communication spectrum for UE transmissions in response to a successful listen before talk (LBT) procedure. The UE may then generates a COT structure information (COT-SI) message including at least a remaining duration of the current COT and a set of time and frequency resources of the current COT. The COT-SI message may be transmitted by the UE to one or more neighboring UEs via sidelink transmission. Once the COT-SI message is sent, the UE transmits the UE transmission within the set of time and frequency resource of the current COT.

24 Claims, 10 Drawing Sheets

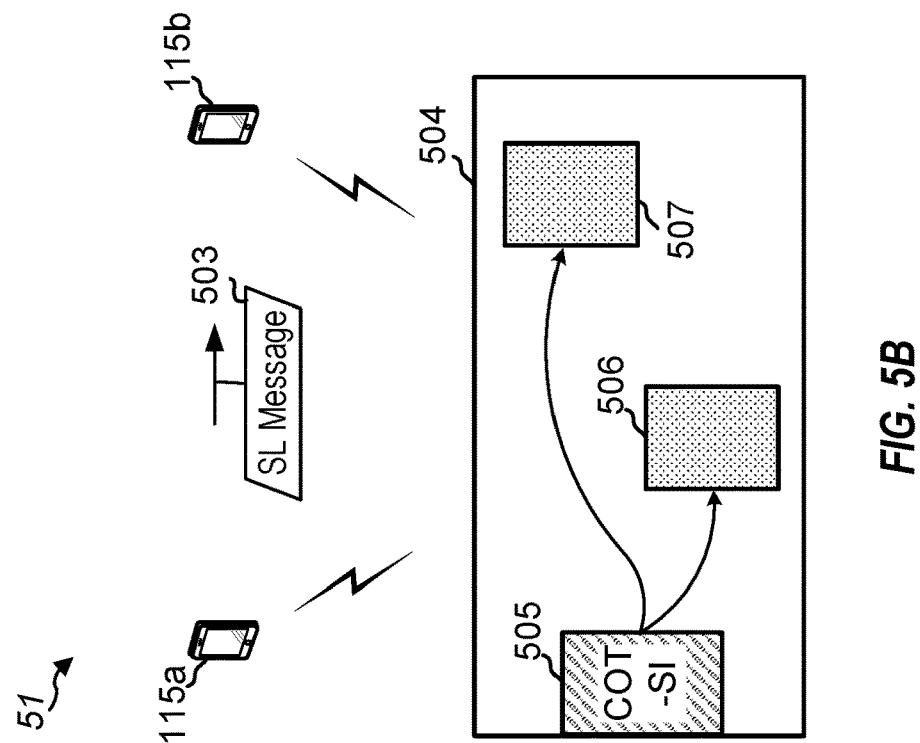
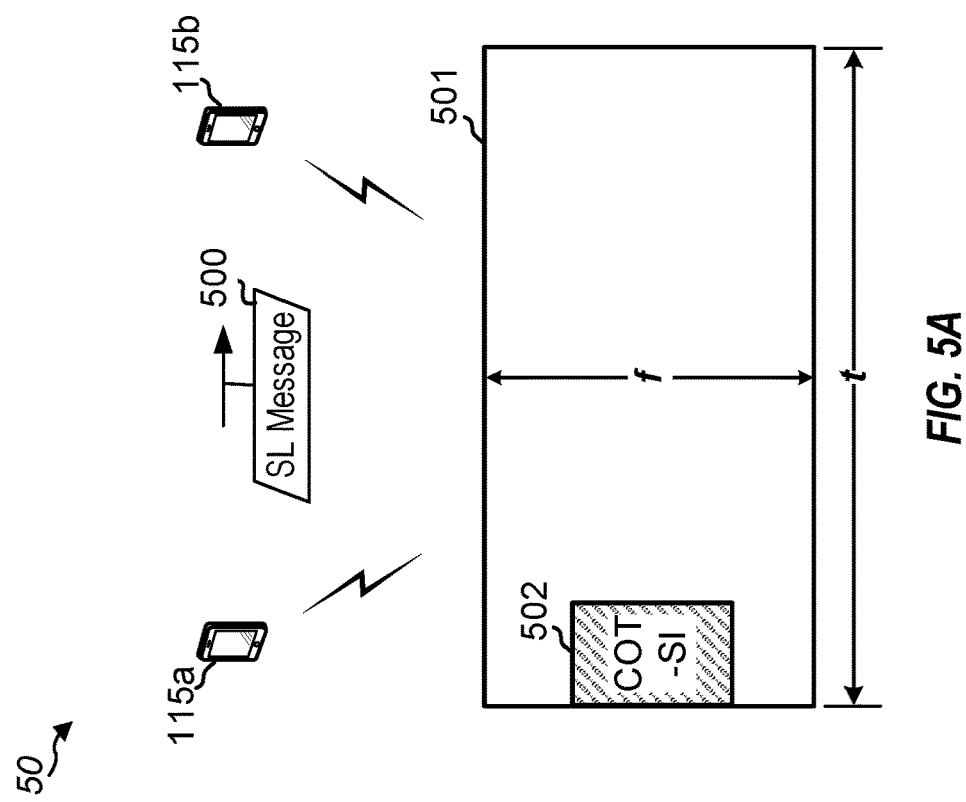

CHANNEL OCCUPANCY TIME-STRUCTURE INFORMATION INDICATION FOR NEW RADIO-UNLICENSED SIDELINK

TECHNICAL FIELD

Aspects of the present disclosure relate generally to wireless communication systems, and more particularly, to communications within new radio-unlicensed (NR-U) operations. Some features may enable and provide improved communications, including indication of channel occupancy time-structure information (COT-SI) for NR-U sidelink (NR-U SL) operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a UE, includes establishing, by the UE, a current COT on a shared communication spectrum for UE transmissions in response to success of a LBT procedure, generating, by the UE, a COT-SI message including at least a remaining duration of the current COT and a set of time and frequency resources of the current COT, transmitting, by the UE, the COT-SI message to one or more neighboring UEs via sidelink transmission, and transmitting, by the UE, the UE transmissions within the set of time and frequency resources of the current COT.

In an additional aspect of the disclosure, an apparatus configured for wireless communication includes means for establishing, by the UE, a current COT on a shared communication spectrum for UE transmissions in response to success of a LBT procedure, means for generating, by the UE, a COT-SI message including at least a remaining duration of the current COT and a set of time and frequency resources of the current COT, means for transmitting, by the UE, the COT-SI message to one or more neighboring UEs via sidelink transmission, and means for transmitting, by the UE, the UE transmissions within the set of time and frequency resources of the current COT.

In an additional aspect of the disclosure, a non-transitory computer-readable medium having program code recorded thereon. The program code further includes code to establish, by the UE, a current COT on a shared communication spectrum for UE transmissions in response to success of a LBT procedure, code to generate, by the UE, a COT-SI message including at least a remaining duration of the current COT and a set of time and frequency resources of the current COT, code to transmit, by the UE, the COT-SI message to one or more neighboring UEs via sidelink transmission, and code to transmit, by the UE, the UE transmissions within the set of time and frequency resources of the current COT.

In an additional aspect of the disclosure, an apparatus configured for wireless communication is disclosed. The apparatus includes at least one processor, and a memory coupled to the processor. The processor is configured to establish, by the UE, a current COT on a shared communication spectrum for UE transmissions in response to success of a LBT procedure, to generate, by the UE, a COT-SI message including at least a remaining duration of the current COT and a set of time and frequency resources of the current COT, to transmit, by the UE, the COT-SI message to one or more neighboring UEs via sidelink transmission, and to transmit, by the UE, the UE transmissions within the set of time and frequency resources of the current COT.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 5A and 5B are block diagrams illustrating wireless communications systems having UEs configured for COT-SI indications for NR-U SL operations according to aspects of the present disclosure.

Like reference numbers and designations in the various drawings indicate like elements.

DETAILED DESCRIPTION

Figure 1:
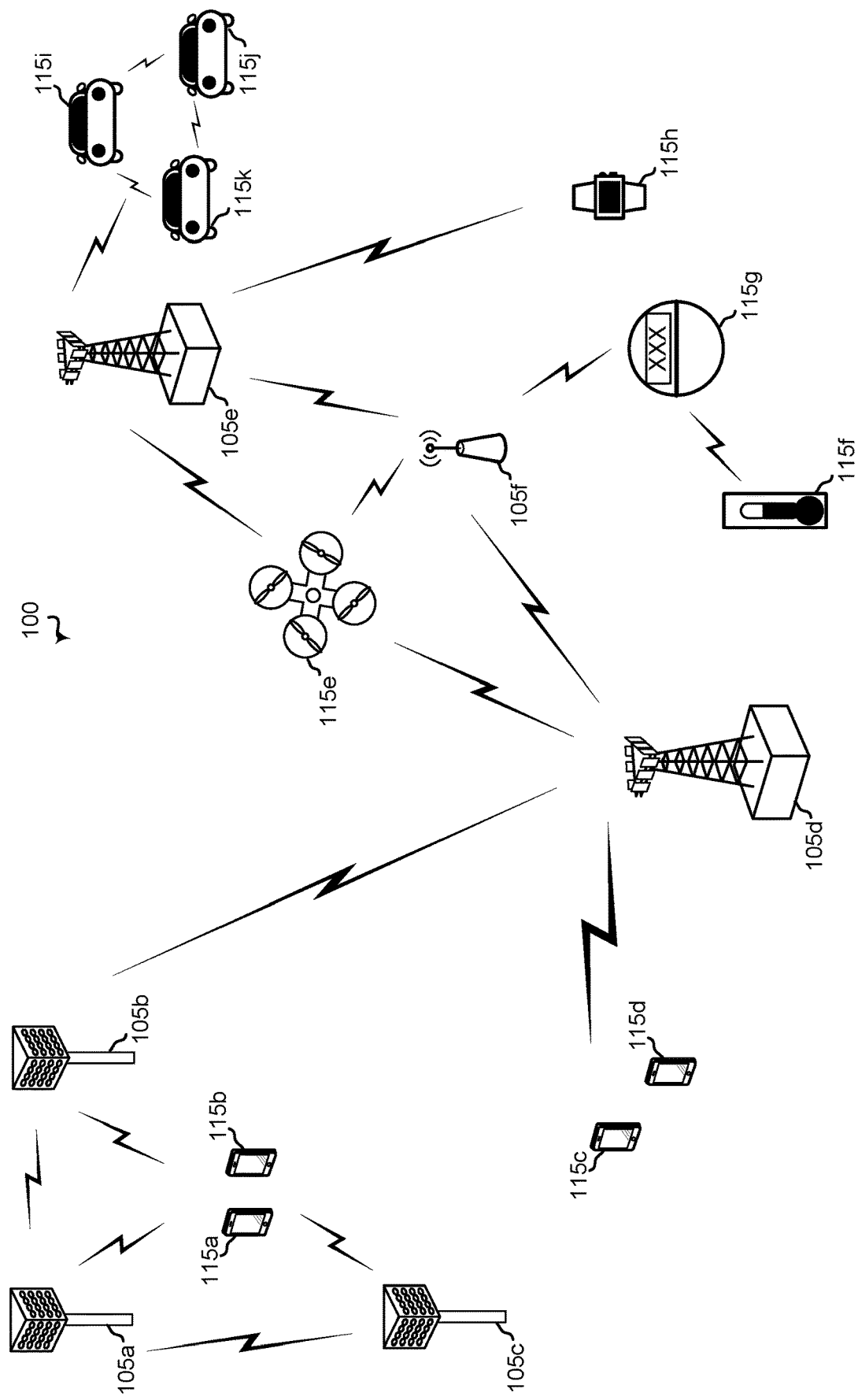
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support COT-SI indications for NR-U SL operations according to various aspects of the present disclosure. The initiating node establishing a COT may include structure information in a COT-SI message that includes at least the remaining duration of the COT and the time and frequency resources defining the COT. Various additional aspects may provide for the COT-SI to also include identification of the time and frequency resources of one or more reserved resource regions within the COT specifically reserved for the initiating UE's transmissions.

Particular implementations of the subject matter described in this disclosure may be implemented to realize one or more of the following potential advantages or benefits. In some aspects, the present disclosure provides techniques for sharing the COT of an initiating UE with other neighboring UEs for sidelink transmissions. In additional aspects, the sharing may be accompanied by various additional structure information on the shared COT, such as restricted resource regions that are not shared, in additional to other FDM or TDM sharable regions. Such structure information allows for more efficient sharing of the COT by the neighboring UEs.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 millisecond (ms)), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

In some cases, a wireless network may operate in a shared radio frequency spectrum band, which may include licensed or unlicensed (e.g., contention-based) frequency spectrum. For example, such wireless networks may employ license assisted access (LAA), LTE-unlicensed (LTE-U) radio access technology, or NR technology in an unlicensed band (NR-U), such as the 5 GHz ISM band. In the unlicensed frequency portion of the shared radio frequency spectrum band in such networks, network nodes (e.g., UEs and base stations) may perform a medium-sensing procedure to contend for access to the frequency spectrum. For example, a UE or base station may perform a listen-before-talk or listen-before-transmitting (LBT) procedure, such as a clear channel assessment (CCA), prior to communicating in order to determine whether the shared channel is available or occupied.

In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. Base stations and UEs operating in such unlicensed spectrum may be operated by the same or different network operating entities. In some examples, an individual base station or UE may be operated by more than one network operating entity. In other examples, each base station and UE may be operated by a single network operating entity. As each base station and UE of different network operating entities may contend for the shared resources, increased signaling overhead and communication latency may result.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

For clarity, certain aspects of the apparatus and techniques may be described below with reference to example 5G NR-U implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
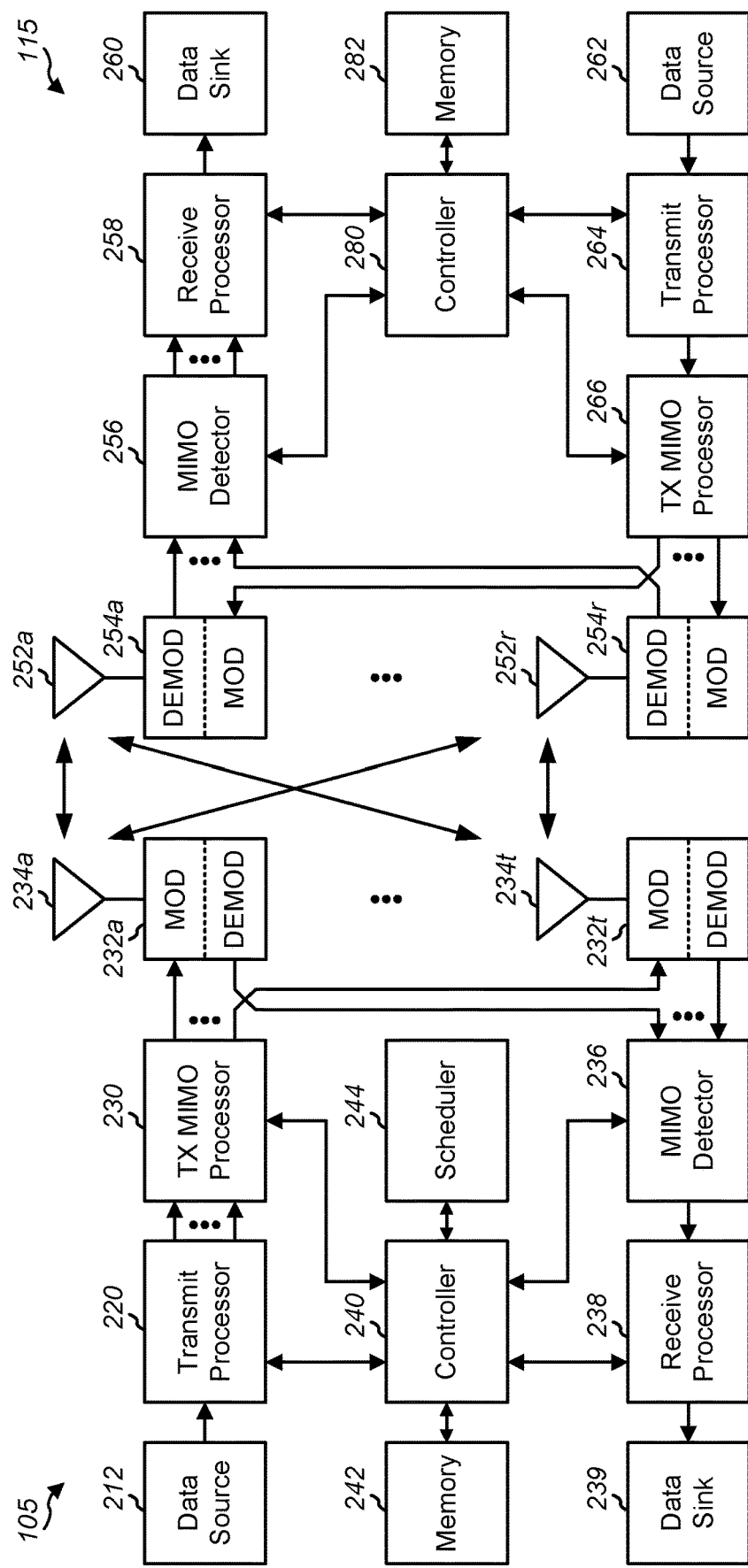
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 4, or other processes for the techniques described herein. Memories 242 and 282 may store data and program codes for base station 105 and UE 115, respectively. Scheduler 244 may schedule UEs for data transmission on the downlink or the uplink.

In NR-U operations, downlink control information (DCI) format 2_0 has been enhanced to carry channel occupancy time—structure information (COT-SI). Such COT-SI may include time domain information, such as COT duration. If the COT-SI is not present in the DCI message, the slot format indicator (SFI) may be used as COT duration. COT-SI may also include frequency domain information identifying the frequency range of the COT. Such frequency domain information may be provided via a resource block (RB) set indicator which may include one bit for each RB set. For NR-U sideline (SL) operations, SL transmissions can be quite bursty. If each UE were to perform a CAT 4 LBT before initiating a COT, the channel access overhead may be large, and there may be high mutual blocking between such UEs. To address such issues, COT sharing has been suggested between UEs to make channel access more efficient. COT sharing between SL UEs may be implemented by the initiating UE providing COT structure information to the additional SL UEs.

Consideration may be given to the level of information to provide. For example, the initiating UE may provide just the time and frequency domain boundaries of the COT. Alternatively, the FDM and TDM sharing regions may be provided. Further still, the initiating UE may provide even more details on the COT time/frequency parameters and a description of the sharable and/or non-sharable resources within the COT. Additional considerations may include the level of consistency to maintain between different COT-SI indications.

Figure 3:
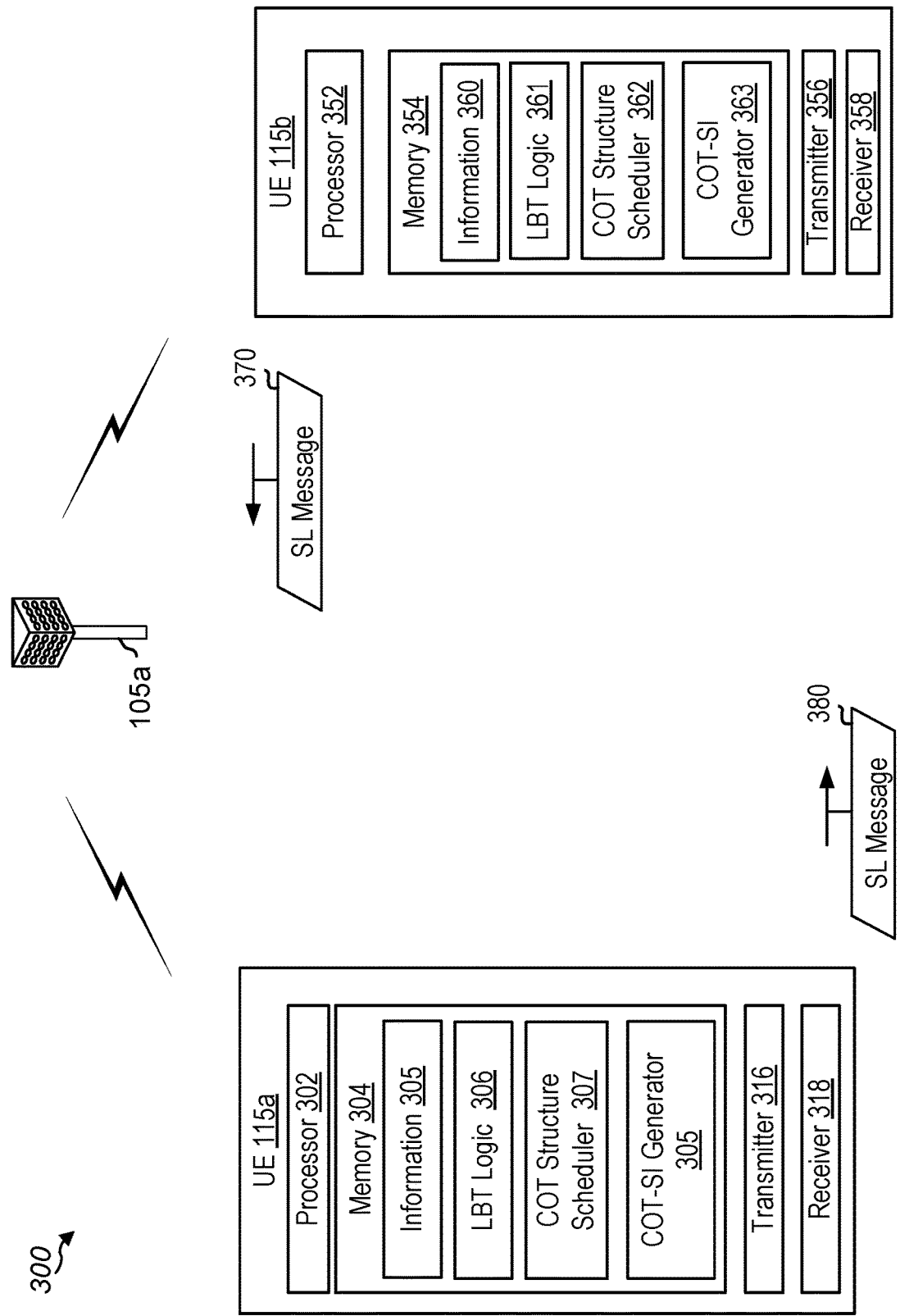
FIG. 3 is a block diagram of an example wireless communications system that supports COT-SI indication for NR-U SL operations according to one or more aspects.

FIG. 3 is a block diagram of an example wireless communications system 300 that supports COT-SI indication for NR-U SL operations according to one or more aspects. In some examples, wireless communications system 300 may implement aspects of wireless network 100. Wireless communications system 300 includes UEs 115a and 115b and base station 105a. Although two UEs and one base station are illustrated, in some other implementations, wireless communications system 300 may generally include multiple UEs, similar to UEs 115a and 115b, and may include more than one base station, similar to base station 105a.

UEs 115a and 115b may include a variety of components (such as structural, hardware components) used for carrying out one or more functions described herein. Detail of such variety of components have been described with respect to UE 115 of FIG. 2. For example, these components may include one or more processors 302/352 (hereinafter referred to respectively as "processor 302" and "processor 352"), one or more memory devices 304/354 (hereinafter referred to respectively as "memory 304" and "memory 354"), one or more transmitters 316/356 (hereinafter referred to respectively as "transmitter 316" and "transmitter 356"), and one or more receivers 318/358 (hereinafter referred to respectively as "receiver 318" and "receiver 358"). Processor 302 and processor 352 may be configured to execute instructions stored in memory 304 and memory 354, respectively, to perform the operations described herein. In some implementations, processor 302 or processor 352 may include or correspond to one or more of receive processor 258, transmit processor 264, and controller 280, as illustrated in FIG. 2, and memory 304 or memory 354 may include or correspond to memory 282, as illustrated in FIG. 2.

As illustrated, memory 304 and memory 354 include or are configured to store information 305/360, LBT logic 306/361, COT structure scheduler 307/362, and COT-SI generator 308/363. Memory 304 and memory 354 would include or would be configured to store additional code or information for general communication operations. The identified memory items herein are used in support of the COT-SI indication for NR-U SL operations according to one or more aspects described herein. For example, information 305/360 may include data or control information identified for either or both of uplink transmissions, via base station 105, or sideline transmissions to other neighboring UEs (e.g., UE 115b for UE 115a SL transmissions, or UE 115a for UE 115b SL transmissions). LBT logic 306/361 includes the code and instructions for implementing LBT capabilities at UEs 115a and 115b. Under control of processor 302 or processor 352, respectively, UE 115a or 115b executes LBT logic 306/361 to enable an LBT procedure (e.g., CCA, CAT 1-4 LBT, etc.). The functionality implemented and enabled through execution of LBT logic 306/361 may be referred to herein as the "execution environment" of LBT logic 306/361. With operations in an NR-U network, such as wireless communications system 300, UEs 115a and 115b may perform an LBT procedure within the execution environment of LBT logic 306/361 in order to secure a COT for uplink or sidelink transmissions.

The execution environment of COT structure scheduler 307/362, when executed under control of processor 302 or processor 352, respectively, enables UE 115a or 115b to manage a COT secured by a successful LBT procedure. UE 115a or 115b may, respectively, under control of the associated processor 302 or processor 352, execute COT-SI generator 308/363 to generate the COT-SI message for communicating structure information regarding the current COT to neighboring UEs for sidelink communications (e.g., UE 115b for UE 115a SL transmissions, or UE 115a for UE 115b SL transmissions).

Transmitter 316 and transmitter 356 are configured to transmit reference signals, control information and data to one or more other devices, such as base station 105a via uplink transmissions or another UE (e.g., UEs 115a or 115b) via sidelink transmissions, and receiver 318 and receiver 358 are configured to receive references signals, synchronization signals, control information and data from one or more other devices. For example, transmitter 316 may transmit signaling, control information and data to, and receiver 318 may receive signaling, control information and data from, base station 105 or UE 115b. In some implementations, transmitter 316 and receiver 318 may be integrated in one or more transceivers. Additionally or alternatively, transmitter 316 or receiver 318 may include or correspond to one or more components of UE 115 described with reference to FIG. 2.

According to one aspect of the present disclosure, UE 115a may successfully establish a COT on the shared communication spectrum of wireless communications network 300 after detecting a successful LBT procedure performed within the execution environment of LBT logic 306. UE 115a may then determine, within the execution environment of COT structure scheduler 307, a duration of the current COT as well as the time and frequency resource boundaries of the COT. Such time and frequency resources may be indicated via a set of resource blocks (RBs) for the COT identified by a bit map, where each bit identifies an RB of the set. With the structure information on the current COT determined, UE 115a may, within the execution environment of COT-SI generator 308, generate a COT-SI message that includes the remaining COT duration and time and frequency resources of the current COT. UE 115a may then transmit the COT-SI message (e.g., SL message 380) using transmitter 316 for sidelink transmission.

In one example implementation, UE 115a may instruct transmitter 316 to piggyback the COT-SI message with other transmission in a unicast, groupcast, or broadcast-type transmissions, such as part of sidelink control information 1 (SCI1) or SCI2. Current standards provide that all UEs may have the capability to decode the information in the two SCI formats (SCI1 and SCI2). Alternatively, UE 115a may instruct transmitter 316 to separately transmit the COT-SI in a dedicated transmission, e.g., within an SCI2 or within a physical sidelink shared channel (PSSCH) portion of a physical sideline control channel (PSCCH)/PSSCH transmission. UE 115b may receive SL message 380 via receiver 358 including the COT-SI message and know that it may share transmission resources with the COT initiated by UE 115a.

It should be noted that, while the previous description of COT establishment and communication of COT-SI to neighboring UEs was described with respect to UE 115a being the COT-initiating UE, the various aspects may also be implemented by other neighboring UEs, such as UE 115b. In such alternative example, UE 115b would establish the COT and communicate the COT-SI, such as via SL message 370, to UE 115a in a similar manner.

It should further be noted that sidelink communication capability, such as the sidelink communication capabilities of UEs 115a and 115b may be configured as an autonomous capability, such that UEs 115a and 115b may autonomously elect to perform sideline communications when supported by the environment where UEs 115a and/or 115b are located. Additional aspects may provide for sidelink communication capabilities to be controlled by the network, such as via enablement signals transmitted from base station 105. In such additional aspects, base station 105 may determine whether the current environment would support or benefit from UE sidelink communications and, in response to such determination, signal sidelink communication enabling signals to either or both of UEs 115a and 115b.

Figure 4:
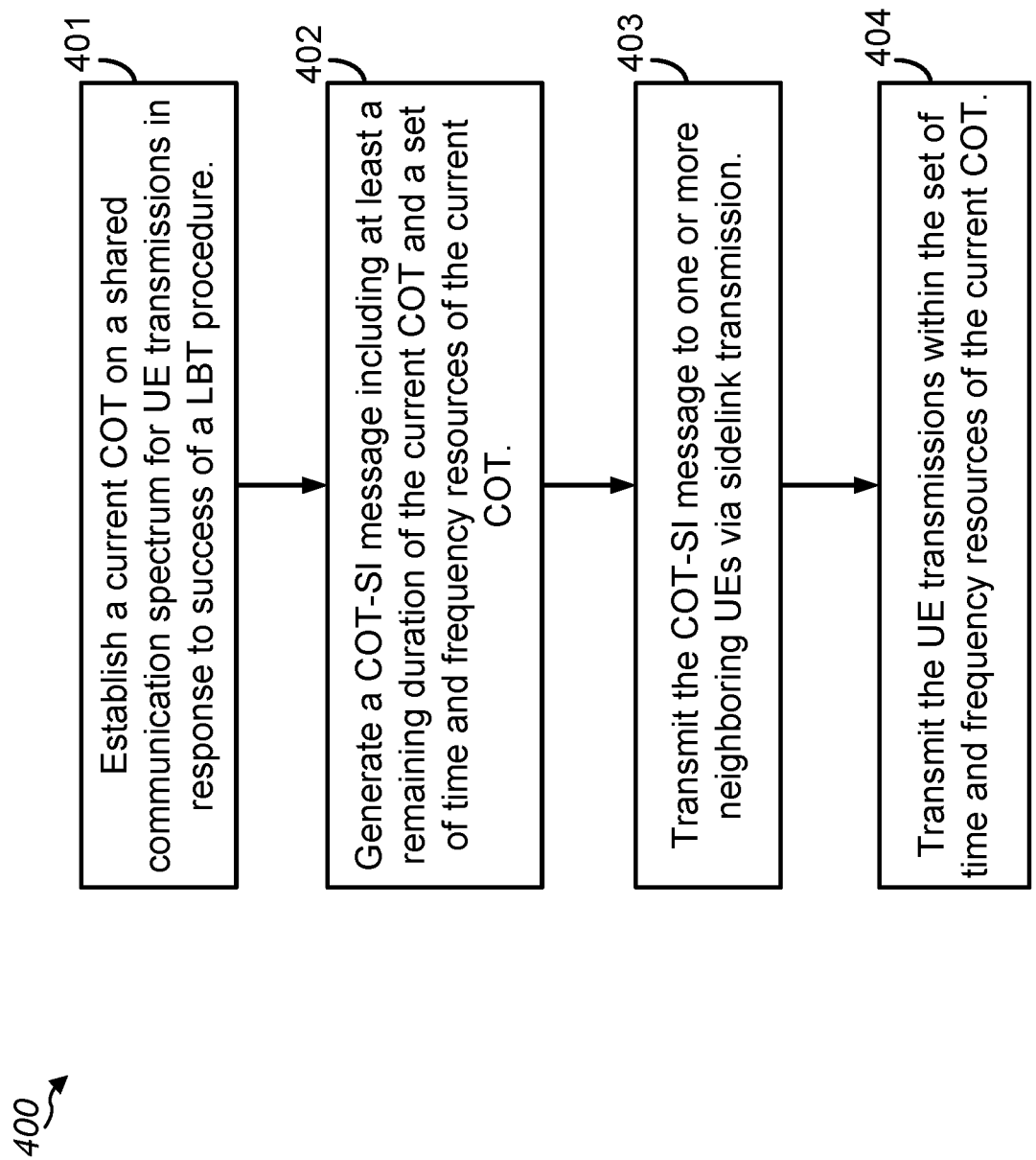
FIG. 4 is a block diagram illustrating example blocks executed by a UE to implement a process that provides COT-SI indication for NR-U SL operations according to one or more aspects of the present disclosure.
Figure 9:
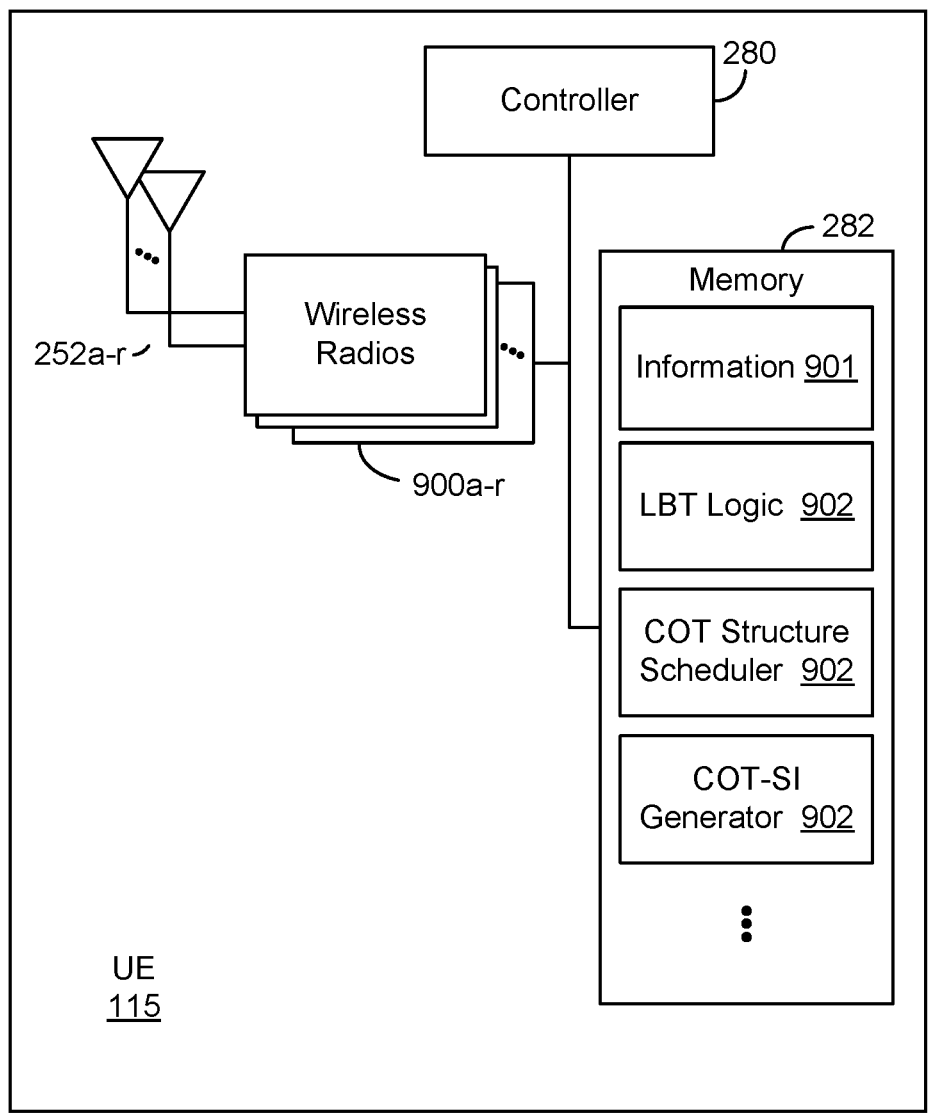
FIG. 9 is a block diagram of an example UE that supports COT-SI indication for NR-U SL operations according to one or more aspects.

FIG. 4 is a block diagram illustrating example blocks executed by a UE to implement a process 400 that provides COT-SI indication for NR-U SL operations according to one or more aspects of the present disclosure. The example blocks will also be described with respect to UE 115 as illustrated in FIGS. 2 and 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 401, a UE establishes a current COT on a shared communication spectrum for UE transmissions in response to success of a LBT procedure. A UE, such as UE 115 includes control or data signals stored in memory 282 at information 901. The control or data signals for information 901 may trigger UE 115, under control of controller/processor 280, to establish a current COT on the shared communication spectrum. Under control of controller/processor 280, LBT logic 902 is executed. Within the execution environment of LBT logic 901, UE 115 performs and LBT procedure on the shared communication channel spectrum and, in response to detecting a successful LBT, UE 115 may establish a COT on the shared channel.

UE 115 may, under control of controller/processor 280, executes COT structure scheduler 902. The execution environment of COT structure scheduler 902 may enable UE 115 to manage a COT secured by a successful LBT procedure. UE 115 may, under control of the associated processor 280, further execute COT-SI generator 902.

At block 402, the UE generates a COT-SI message including at least a remaining duration of the current COT and a set of time and frequency resources of the current COT. The execution environment of COT-SI generator 902 allows UE 115 to generate the COT-SI message for communicating structure information regarding the current COT to neighboring UEs for sidelink communications.

At block 403, the UE transmits the COT-SI message to one or more neighboring UEs via sidelink transmission. Once the COT-SI message is generated, within the execution environment of COT-SI generator 902, UE 115 may transmit the COT-SI to neighboring UEs via sidelink transmission via wireless radios 900a-r and antennas 252a-r.

At block 404, the UE transmits the UE transmissions within the set of time and frequency resources of the current COT. With the COT-SI message sent, UE 115 may now transmit the UE transmissions via wireless radios 900a-r and antennas 252a-r.

FIGS. 5A and 5B are block diagrams illustrating wireless communications systems 50 and 51 having UEs 115a and 115b configured for COT-SI indications for NR-U SL operations according to aspects of the present disclosure. After performing a successful LBT procedure, UE 115a may secure COT 501 within the shared communication spectrum of wireless communications system 50. UE 115a determines the time, t, and frequency, f resources defining COT 501 and transmits COT-SI 502 via SL message 500 to neighboring UEs, such as UE 115b. As illustrated in FIG. 5A, COT-SI 502 includes the remaining duration of COT 501 and the time and frequency resources (t×f) of COT 501. Upon receive of SL message 500 containing COT-SI 502, UE 115b identifies that it may share COT 501 within the boundaries of the communicated time and frequency resources and outside of the resources used for COT-SI 502. Accordingly, if UE 115b were to initiate the communication process, it may perform an abbreviated LBT procedure (e.g., a CAT 1 or CAT 2 LBT procedure) prior to transmitting the information within the shared region of COT 501.

Current mechanisms defined for SCI1 messaging allows for the initiating UE to allocate up to two future slots within a 31 slot range of a current COT that are reserved for the initiating UE communication and not sharable with neighboring UEs. FIG. 5B illustrates such a configuration. After successfully establishing COT 504 with a successful LBT procedure, UE 115a generates COT-SI 505 to include not only the remaining duration of COT 504, and the time and frequency resources of COT 504, but also identification of slot 506 and slot 507 that are reserved for UE 115a communications and are not sharable by other UEs, including UE 115b. UE 115a would send such COT-SI 505 to UE 115b via SL message 503.

Figure 6A:
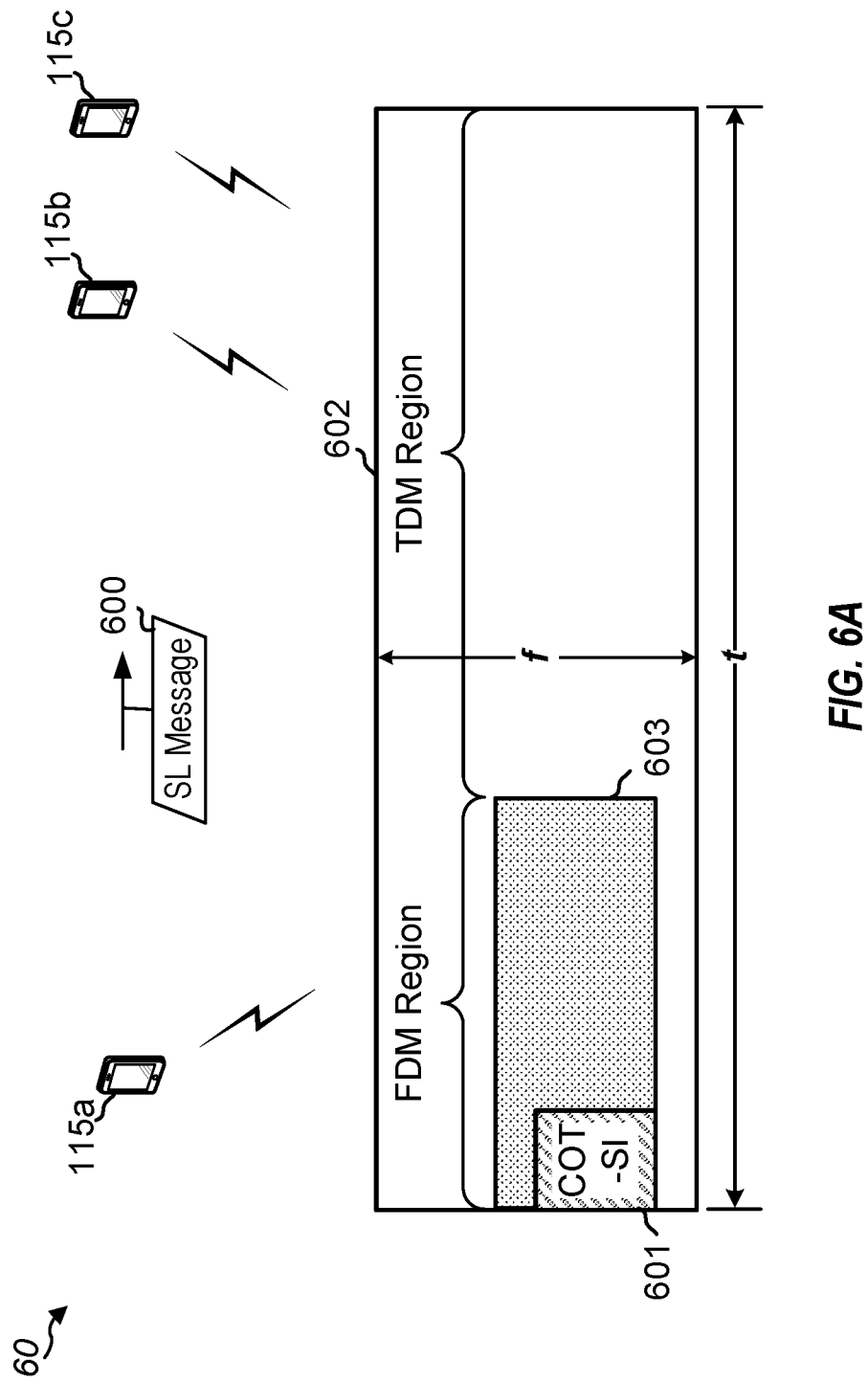
FIGS. 6A and 6B are block diagrams illustrating wireless communications systems having UEs configured for COT-SI indications for NR-U SL operations according to aspects of the present disclosure.

FIG. 6A is a block diagram illustrating wireless communications system 60 having UEs 115a-115c configured for COT-SI indications for NR-U SL operations according to aspects of the present disclosure. After performing a successful LBT procedure, UE 115a may secure COT 602 within the shared communication spectrum of wireless communications system 60. UE 115a determines the time and frequency resources (t×f) defining COT 602. In generating the structure information for COT-SI 601, according to the illustrated aspect, UE 115a may also determine a set of time and frequency resources defining a reserved set of resources, reserved resource region 603. UE 115a may then transmit COT-SI 601 via SL message 600 to neighboring UEs, such as UEs 115b and 115c. COT-SI 601 will include the remaining duration of COT 602, the time and frequency resources (t×f) defining COT 602, and the set of time and frequency resources defining reserved resource region 603.

By including the set of time and frequency resources defining reserved resource region 603, UE 115a provides additional information to UEs 115b and 115c that defines a sharable FDM region and a sharable TDM region within COT 602. Other UEs, such as UEs 115b and 115c, can perform TDM sharing in the sharable TDM region, and FDM sharing in the sharable FDM region. UEs 115b and 115c will also know that reserved resource region 603 is not sharable and, thus, UEs 115b and 115c will not attempt access to the shared communication spectrum within COT 602 that falls within reserved resource region 603. Such an enhanced design may to take advantage of the bursty nature of these transmissions, such as with enhanced mobile broadband (eMBB) traffic.

Reserved resource region 603 may be defined in the form of a time/frequency domain rectangle as a product of a set of frequency domain resources and continuous time domain resources. The set of frequency domain resources may be implemented as a set of continuous subchannels where legacy waveforms are used, or may be a set of non-continuous interlaces where interlaced waveforms are used.

Figure 6B:
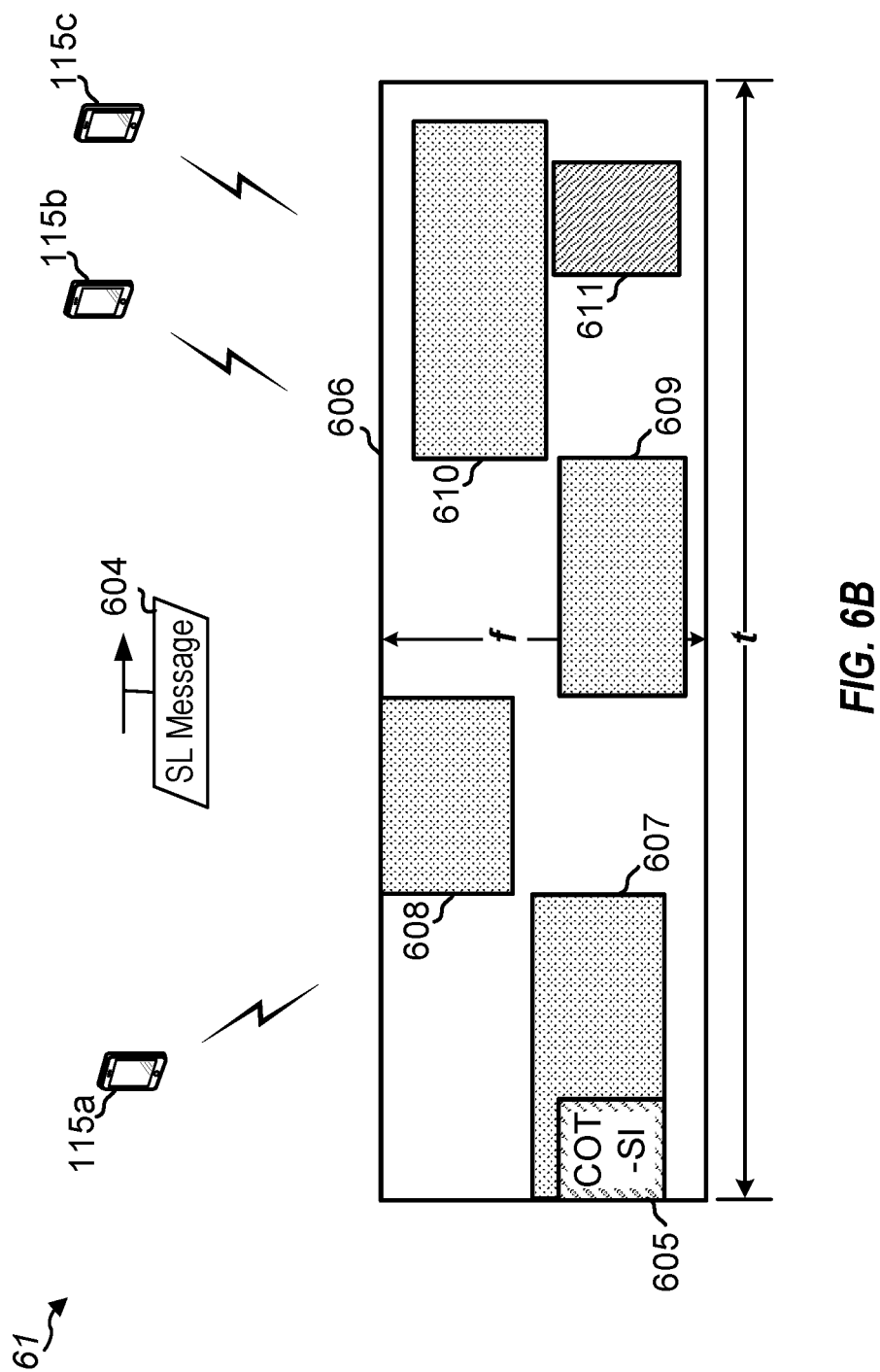

FIG. 6B is a block diagram illustrating wireless communications system 61 having UEs 115a-115c configured for COT-SI indications for NR-U SL operations according to aspects of the present disclosure. After performing a successful LBT procedure, UE 115a may secure COT 606 within the shared communication spectrum of wireless communications system 61. UE 115a determines the time and frequency resources (t×f) defining COT 606. In generating the structure information for COT-SI 605, according to the illustrated aspect, UE 115a may also determine a set of time and frequency resources defining a reserved set of resources. The reserved set of resources may define multiple reserved resource regions 607-610 dispersed within the time and frequency resources (t×f) defining COT 606. Each of reserved resource regions 607-610 may include a set of frequency domain resources (e.g., continuous subchannels, non-continuous interlaces, etc.) and a set of continuous time domain resources. COT-SI 605 would include identification of these resources that define each of reserved resource regions 607-610. UE 115a would transmit COT-SI 605 to the other UEs, such as UEs 115b and 115c via SL message 604.

The design of the illustrated aspect provides a more flexible set of reserved resources but at the cost of larger size of COT-SI 605. Such a design may beneficially serve an anchor-client deployment model, where an anchor UE serves multiple clients and, thus, may beneficially use multiple reserved resource regions, such as reserved resource regions 607-610. Considering the increased size of COT-SI 605, UE 115a may consider transmitting SL message 604, which includes COT-SI 605, in an SCI2 message configuration.

It should be noted that restrictions may be predefined or predetermined as to what resources can be specifically reserved for the initiating UE, UE 115a, and, thus not sharable with other UEs, such as UEs 115b-115c.

According to legacy channel access requirements, a UE may not be able to continue or resume transmissions if there is a relatively large gap since the end of the prior communications. Therefore, UE 115a may schedule the time domain resources of reserved resource regions 607-610 to be either continuous to each time domain resource of a prior reserved region or, at least, within a predetermined threshold gap (e.g., up to one of 16 µs or 25 µs). As suggested above, each of reserved resource regions 607-610 may include non-continuous frequency domain resources.

It should be noted that reserved resource regions 607-610 may be reserved for transmissions by the initiating UE, UE 115a, or for any UEs that are granted for transmission by UE 115a. Thus, for example, UE 115a may grant UE 115c permission to transmit on restricted resource region 608. Therefore, while UEs 115a and 115c may transmit within restricted resource region 608, UE 115b may only transmit in the sharable FDM region around restricted resource region 608 over the same time domain resources.

While the example aspects described with respect to FIGS. 6A and 6B provide for the initiating UE, UE 115a, to include remaining COT duration, the time and frequency resources (t×f) defining the current COT (COTs 602/606), as well as the set of time and frequency resources that define the one or more reserved resource regions (reserved resource regions 603/607-610), it is conceivable that UE 115a may experience a condition that might change the initially planned communication schedule that may have contributed to the scheduling of the reserved resource regions (reserved resource regions 603/607-610). The question then arises as to what level of consistency should be maintained between different COT-SI messages for the same resource.

The existing standards describing the NR slot format indicator (SFI) feature addresses maintaining consistency in the sense that for a given SFI, the slot format indicated for a particular slot does not change across different SFIs which cover the same slot. However, for COT-SI messaging, while the COT duration can increase (but not decrease), for a COT-SI message indicating the COT for sidelink transmissions where some resource may be identified as non-sharable, the question arises as to whether the network should allow the non-sharable resource to change to be sharable. The converse situation may also occur in the context of another node detecting the COT-SI which identifies a particular resource as sharable. The network may provide that the assumption of the resource being sharable will always be valid, or that the initiating UE, UE 115a, can, in fact, change its mind. However, where the network provides the capability for UE 115a to change its mind, UE 115a may provide signaling that triggers the change, in order to provide the changed information to neighboring UEs, such as UEs 115b and 115c.

Enforcing consistency may provide the more restrictive aspect, in which the identified sharable or non-sharable status of resources for a particular COT will not change. However, if the initiating UE, UE 115a, changes its mind or encounters a change in communications and wants to use a previously-indicated sharable resource, UE 115a would contend for access to that sharable resource with other nodes.

For example, referring back to FIG. 6B, UE 115a transmits COT-SI 605 within SL message 604 identifying the remaining duration of COT 606, the time and frequency resources (t×f) of COT 606, and the set of time and frequency resources that define reserved resource regions 607-610. UE 115a subsequently changes its mind or encounters some change in communications which it determines to attempt transmissions within the previously-indicated sharable region 611. However, because UE 115a did not originally schedule sharable region 611 as a reserved region, such as reserved resource regions 607-610, before UE 115a may attempt communications within sharable region 611, it would perform an LBT procedure in order to contend for access to the shared communication spectrum of sharable region 611 with the other neighboring UEs, such as UEs 115b-115c. In other words, there will be no extra protection for the initiating UE, UE 115a, to use a sharable resource in its own COT, COT 606, even though UE 115a is still allowed to share use of the sharable resource. In this case, UE 115a will act as a responding device to itself.

It should be noted that the legacy access rules would still apply. For example, the legacy access rules may not allow the initiating UE, UE 115a, to resume transmissions if there has been a gap in excess of the threshold time (e.g., up to one of 16 µs or 25 µs). In such case, UE 115a could reclaim an FDM resource with its own transmission and a TDM resource consecutive to any reserved resource.

Similar to the SFI feature, the initiating UE, UE 115a, would not necessarily provide all of the COT structure information in the first COT-SI message. Instead, UE 15a could "extend" the COT duration in time domain, such as in a later COT-SI for the same COT, and indicating a later COT ending position.

Figure 7:
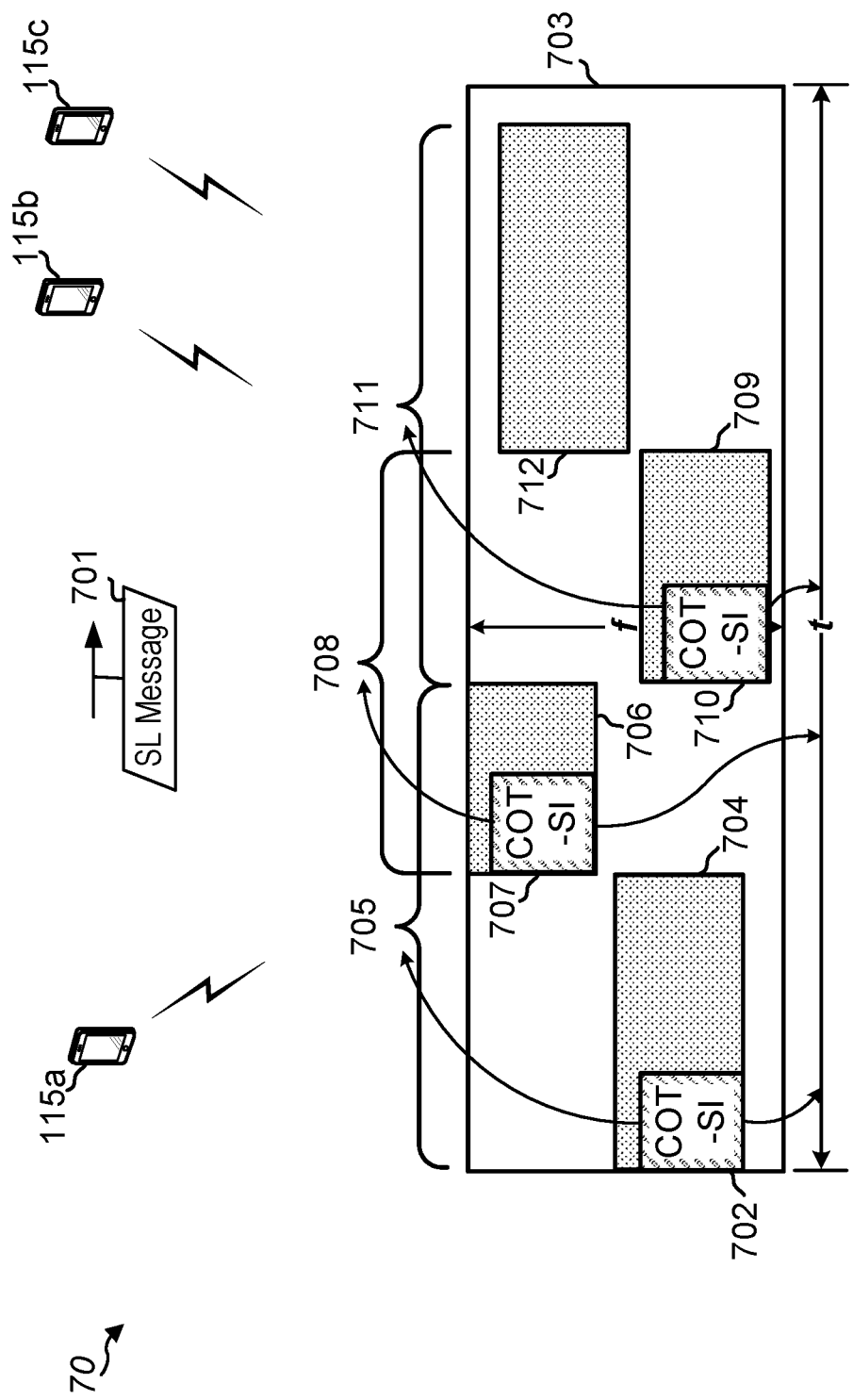
FIG. 7 is a block diagram illustrating wireless communications system having UEs configured for COT-SI indications for NR-U SL operations according to aspects of the present disclosure.

FIG. 7 is a block diagram illustrating wireless communications system 70 having UEs 115a-115c configured for COT-SI indications for NR-U SL operations according to aspects of the present disclosure. After performing a successful LBT procedure, UE 115a may secure COT 703 within the shared communication spectrum of wireless communications system 70. UE 115a determines the time and frequency resources (t×f) defining COT 703. In generating the structure information for COT-SI 702, according to the illustrated aspect, UE 115a may also determine an initial set of time and frequency resources defining reserved resource regions 704 and 706. COT-SI 702, sent by UE 115a in SL message 701, would then include the remaining duration of COT 703, the time and frequency resources (t×f) defining COT 703, and the time and frequency resources of reserved resource regions 704 and 706 within a first sharing range 705. Upon receipt of SL message 701 with COT-SI 702, the other UEs, UEs 115b and 115c, know the parameters of COT 703 and know the non-sharable regions, defined by reserved resource regions 704 and 706. However, at the time of COT-SI 702, the remaining portions of COT 703 appear to be sharable for UEs 115b and 115c.

UE 115a may generate a second COT-SI message, COT-SI 707, which provides further structure information for COT 703. COT-SI 707 may also include the remaining duration of COT 703, the time and frequency resources (t×f) defining COT 703, as provided in COT-SI 702. However, COT-SI 707 may now include identification of further reserved resources, with identification of reserved resource regions 706 and 709 within a second sharing range 708. Similarly, UE 115a may generate a third COT-SI message, COT-SI 710, which, in addition to the original information on the boundaries of COT 703, COT-SI 710 will also include identification of reserved resource regions 709 and 712 within a third sharing range 711. According to the illustrated aspect, the initiating UE, UE 115a, provides the basic parameters of the established COT, COT 703 in COT-SI 702, but only provides the sharability information for reserved regions within a predetermined time period of COT-SI 702. Each successive COT-SI message, COT-SI 707 and 710, will then provide the additional sharability information over the remaining sharing ranges (second and third sharing ranges 708 and 711).

Figure 8:
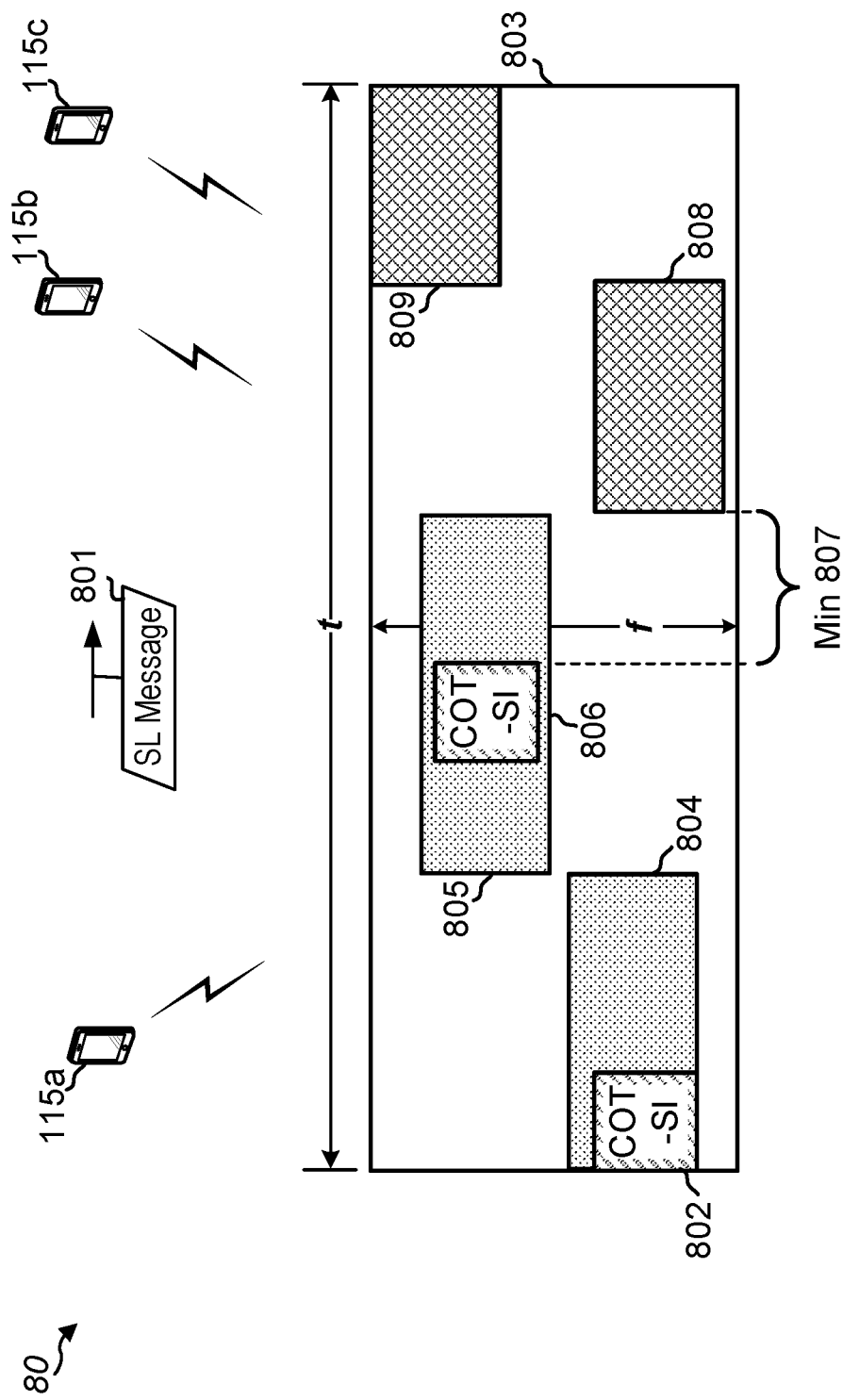
FIG. 8 is a block diagram illustrating wireless communications system having UEs configured for COT-SI indications for NR-U SL operations according to aspects of the present disclosure.

FIG. 8 is a block diagram illustrating wireless communications system 80 having UEs 115a-115c configured for COT-SI indications for NR-U SL operations according to aspects of the present disclosure. After performing a successful LBT procedure, UE 115a may secure COT 803 within the shared communication spectrum of wireless communications system 80. UE 115a determines the time and frequency resources (t×f) defining COT 803. In generating the structure information for COT-SI 802, according to the illustrated aspect, UE 115a schedules the time and frequency resources for reserved resource regions 804 and 805. Thus, UE 115a includes the remaining duration of COT 803, the time and frequency resources (t×f) defining COT 803, and identification of reserved resource regions 804 and 805 within COT-SI 802, which is then transmitted in SL message 801 to the other UEs, UEs 115b-115c.

The example aspect illustrated in FIG. 8 can be a more general aspect of the design allowing the initiating UE to change its mind for the scheduling the resources of COT 803, as illustrated and described in FIG. 7. According to the illustrated aspect, in order to provide a greater probability that the other UEs, UEs 115b and 115c, receive any indication or message changing the sharable structure of COT 803, UE 115a may transmit a subsequent COT-SI, COT-SI 806, at least a minimum time 807 before the planned first change to the resource characteristic. For example, UE 115a transmits COT-SI 806 within reserved resource region 805 that identifies new reserved resource regions 808 and 809 within COT 803. In order to effectively change the sharable characteristic of the resources covered by reserved resource region 808, UE 115a would transmit COT-SI 806 no later than minimum time 807 prior to the beginning of reserved resource region 808.

The illustrated aspect in FIG. 8 shows how UE 115a may change previously sharable regions of COT 803 to reserved resources, reserved resource regions 808 and 809. However, additional example implementations may allow UE 115a to change reserved, non-sharable regions to become sharable as well. Referring back to FIG. 7, for purposes of this new example, UE 115a may indicate in COT-SI 710, that reserved resource region 712 is no longer reserved and, thus, may be sharable. UE 115a would, again, transmit COT-SI 710 at least a minimum time (e.g., minimum time 807) before the beginning of reserved resource region 712. In each such example implementation, the other UEs, UEs 115b and 115c may compare the COT-SI transmitting source ID in order to identify that a later COT-SI (e.g., COT-SI 710 or COT-SI 806) has modified an earlier COT-SI (e.g., COT-SI 707 or COT-SI 802).

It should be noted, while the more flexible approach to allowing the initiating UE, UE 115a, to change the scheduling or characteristic of resources within a current COT may provide a more efficient use of COT resources, there may be a chance that one or more of the other nodes, UEs 115b and 115c, may fail to receive or decode the COT-SI with the modifications. Thus, transmission collisions may occur when the aspects allow UE 115a to change such scheduling or characteristics.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication performed by a UE may include establishing, by the UE, a current COT on a shared communication spectrum for UE transmissions in response to success of a LBT procedure; generating, by the UE, a COT-SI message including at least a remaining duration of the current COT and a set of time and frequency resources of the current COT; transmitting, by the UE, the COT-SI message to one or more neighboring UEs via sidelink transmission; and transmitting, by the UE, the UE transmissions within the set of time and frequency resources of the current COT.

In a second aspect, alone or in combination with the first aspect, further including: identifying, by the UE, an additional set of time and frequency reserved resources reserved for communications exclusively by the UE, wherein the additional set of time and frequency reserved resources is communicated via one of: the COT-SI message or a subsequent COT-SI message transmitted by the UE within subsequent resources of the additional set of time and frequency reserved resources, and wherein the UE transmissions and the COT-SI message are transmitted within the additional set of time and frequency reserved resources.

In a third aspect, alone or in combination with one or more of the first aspect or the second aspect, wherein the additional set of time and frequency reserved resources defines a shared resource region sharable by the UE and the one or more neighboring UEs and determined by a remaining set of time and frequency resources outside of the additional set of time and frequency reserved resources and within the set of time and frequency resources of the current COT.

In a fourth aspect, alone or in combination with one or more of the first aspect through the third aspect, wherein the additional set of time and frequency reserved resources identifies one of: a single resource region having continuous time resources and a plurality of frequency resources; or a plurality of resource regions, wherein each resource region of the plurality of resource regions includes continuous time resources and a plurality of frequency resources and each subsequent resource region of the plurality of resource regions is located in time one of: continuous or within a predetermined threshold time from a prior resource region of the plurality of resource regions.

In a fifth aspect, alone or in combination with one or more of the first aspect through the fourth aspect, further including: determining, by the UE, additional transmissions to the UE transmissions; identifying, by the UE, a next available resource within the current COT falling within the shared resource region; and performing, by the UE, an abbreviated LBT procedure to contend for access to the shared communication spectrum with the one or more neighboring UEs.

In a sixth aspect, alone or in combination with one or more of the first aspect through the fifth aspect, further including: determining, by the UE, a modification to the UE transmissions; generating, by the UE, a new COT-SI message including a new set of time and frequency reserved resources within the set of time and frequency reserved resources of the current COT that defines one or more new reserved resource regions and one or more new shared resource regions within the current COT; and transmitting, by the UE, the new COT-SI message to the one or more neighboring UEs via a new sidelink transmission.

In a seventh aspect, alone or in combination with one or more of the first aspect through the sixth aspect, wherein the sidelink transmission via which the COT-SI message is transmitted includes one of: an existing sidelink transmission to which the COT-SI message is added; or a dedicated sidelink transmission for the COT-SI message.

In an eighth aspect, alone or in combination with one or more of the first aspect through the seventh aspect, further including: identification, by the UE, within a first type sidelink control information (SCI1) message of up to two slots within the current COT reserved for transmission by the UE.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD- ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    establishing, by the UE, a current channel occupancy time (COT) on a shared communication spectrum for UE transmissions in response to success of a listen before talk (LBT) procedure;
    generating, by the UE, a COT structure information (COT-SI) message including at least a remaining duration of the current COT and a set of time and frequency resources of the current COT, wherein the COT-SI further indicates an additional set of time and frequency resources reserved for communications by the UE;
    transmitting, by the UE, the COT-SI message to one or more neighboring UEs via sidelink transmission; and
    transmitting, by the UE, the UE transmissions within the set of time and frequency resources of the current COT,
    wherein the UE transmissions and the COT-SI message are transmitted within the additional set of time and frequency reserved resources, and
    wherein the additional set of time and frequency reserved resources defines a shared resource region sharable by the UE and the one or more neighboring UEs and determined by a remaining set of time and frequency resources outside of the additional set of time and frequency reserved resources and within the set of time and frequency resources of the current COT.

2. The method of claim 1, wherein the additional set of time and frequency reserved resources identifies one of:
    a single resource region having continuous time resources and a plurality of frequency resources; or
    a plurality of resource regions, wherein each resource region of the plurality of resource regions includes continuous time resources and a plurality of frequency resources and each subsequent resource region of the plurality of resource regions is located in one of: continuously in time or within a predetermined threshold time from a prior resource region of the plurality of resource regions.

3. The method of claim 2, further including:
determining, by the UE, additional transmissions to the UE transmissions;
identifying, by the UE, a next available resource within the current COT falling within the shared resource region; and
performing, by the UE, an abbreviated LBT procedure to contend for access to the shared communication spectrum with the one or more neighboring UEs.

4. The method of claim 2, further including:
determining, by the UE, a modification to the UE transmissions;
generating, by the UE, a new COT-SI message including a new set of time and frequency reserved resources within the set of time and frequency resources of the current COT that defines one or more new reserved resource regions and one or more new shared resource regions within the current COT; and
transmitting, by the UE, the new COT-SI message to the one or more neighboring UEs via a new sidelink transmission.

5. The method of claim 2, wherein the sidelink transmission via which the COT-SI message is transmitted includes one of:
an existing sidelink transmission to which the COT-SI message is added; or
a dedicated sidelink transmission for the COT-SI message.

6. The method of claim 2, further including:
identifying, by the UE, within a first type sidelink control information message of up to two slots within the current COT reserved for transmission by the UE.

7. An apparatus configured for wireless communication, comprising:
means for establishing, by a user equipment (UE), a current channel occupancy time (COT) on a shared communication spectrum for UE transmissions in response to success of a listen before talk (LBT) procedure;
means for generating, by the UE, a COT structure information (COT-SI) message including at least a remaining duration of the current COT and a set of time and frequency resources of the current COT, wherein the COT-SI further indicates an additional set of time and frequency resources reserved for communications by the UE;
means for transmitting, by the UE, the COT-SI message to one or more neighboring UEs via sidelink transmission; and
means for transmitting, by the UE, the UE transmissions within the set of time and frequency resources of the current COT,
wherein the UE transmissions and the COT-SI message are transmitted within the additional set of time and frequency reserved resources,
wherein the additional set of time and frequency reserved resources defines a shared resource region sharable by the UE and the one or more neighboring UEs and determined by a remaining set of time and frequency resources outside of the additional set of time and frequency reserved resources and within the set of time and frequency resources of the current COT.

8. The apparatus of claim 7, wherein the additional set of time and frequency reserved resources identifies one of:
a single resource region having continuous time resources and a plurality of frequency resources; or
a plurality of resource regions, wherein each resource region of the plurality of resource regions includes continuous time resources and a plurality of frequency resources and each subsequent resource region of the plurality of resource regions is located in one of: continuously in time or within a predetermined threshold time from a prior resource region of the plurality of resource regions.

9. The apparatus of claim 8, further including:
means for determining, by the UE, additional transmissions to the UE transmissions;
means for identifying, by the UE, a next available resource within the current COT falling within the shared resource region; and
means for performing, by the UE, an abbreviated LBT procedure to contend for access to the shared communication spectrum with the one or more neighboring UEs.

10. The apparatus of claim 8, further including:
means for determining, by the UE, a modification to the UE transmissions;
means for generating, by the UE, a new COT-SI message including a new set of time and frequency reserved resources within the set of time and frequency resources of the current COT that defines one or more new reserved resource regions and one or more new shared resource regions within the current COT; and
means for transmitting, by the UE, the new COT-SI message to the one or more neighboring UEs via a new sidelink transmission.

11. The apparatus of claim 8, wherein the sidelink transmission via which the COT-SI message is transmitted includes one of:
an existing sidelink transmission to which the COT-SI message is added; or
a dedicated sidelink transmission for the COT-SI message.

12. The apparatus of claim 8, further including:
means for identifying, by the UE, within a first type sidelink control information message of up to two slots within the current COT reserved for transmission by the UE.

13. A non-transitory computer-readable medium having program code recorded thereon, the program code comprising:
program code executable by a computer for causing the computer to establish, by a user equipment (UE), a current channel occupancy time (COT) on a shared communication spectrum for UE transmissions in response to success of a listen before talk (LBT) procedure;
program code executable by the computer for causing the computer to generate, by the UE, a COT structure information (COT-SI) message including at least a remaining duration of the current COT and a set of time and frequency resources of the current COT, wherein the COT-SI further indicates an additional set of time and frequency resources reserved for communications by the UE;
program code executable by the computer for causing the computer to transmit, by the UE, the COT-SI message to one or more neighboring UEs via sidelink transmission; and program code executable by the computer for causing the computer to transmit, by the UE, the UE transmissions within the set of time and frequency resources of the current COT, wherein the UE transmissions and the COT-SI message are transmitted within the additional set of time and frequency reserved resources, wherein the additional set of time and frequency reserved resources defines a shared resource region sharable by the UE and the one or more neighboring UEs and determined by a remaining set of time and frequency resources outside of the additional set of time and frequency reserved resources and within the set of time and frequency resources of the current COT.

14. The non-transitory computer-readable medium of claim 13, wherein the additional set of time and frequency reserved resources identifies one of:
a single resource region having continuous time resources and a plurality of frequency resources; or
a plurality of resource regions, wherein each resource region of the plurality of resource regions includes continuous time resources and a plurality of frequency resources and each subsequent resource region of the plurality of resource regions is located in one of: continuously in time or within a predetermined threshold time from a prior resource region of the plurality of resource regions.

15. The non-transitory computer-readable medium of claim 14, further including:
program code executable by the computer for causing the computer to determine, by the UE, additional transmissions to the UE transmissions;
program code executable by the computer for causing the computer to identify, by the UE, a next available resource within the current COT falling within the shared resource region; and
program code executable by the computer for causing the computer to perform, by the UE, an abbreviated LBT procedure to contend for access to the shared communication spectrum with the one or more neighboring UEs.

16. The non-transitory computer-readable medium of claim 14, further including:
program code executable by the computer for causing the computer to determine, by the UE, a modification to the UE transmissions;
program code executable by the computer for causing the computer to generate, by the UE, a new COT-SI message including a new set of time and frequency reserved resources within the set of time and frequency resources of the current COT that defines one or more new reserved resource regions and one or more new shared resource regions within the current COT; and
program code executable by the computer for causing the computer to transmit, by the UE, the new COT-SI message to the one or more neighboring UEs via a new sidelink transmission.

17. The non-transitory computer-readable medium of claim 14, wherein the sidelink transmission via which the COT-SI message is transmitted includes one of:
an existing sidelink transmission to which the COT-SI message is added; or
a dedicated sidelink transmission for the COT-SI message.

18. The non-transitory computer-readable medium of claim 14, further including:
program code executable by the computer for causing the computer to identify, by the UE, within a first type sidelink control information message of up to two slots within the current COT reserved for transmission by the UE.

19. An apparatus configured for wireless communication, the apparatus comprising:
at least one processor; and
a memory coupled to the at least one processor,
wherein the at least one processor is configured:
to establish, by a user equipment (UE), a current channel occupancy time (COT) on a shared communication spectrum for UE transmissions in response to success of a listen before talk (LBT) procedure;
to generate, by the UE, a COT structure information (COT-SI) message including at least a remaining duration of the current COT and a set of time and frequency resources of the current COT;
to transmit, by the UE, the COT-SI message to one or more neighboring UEs via sidelink transmission, wherein the COT-SI further indicates an additional set of time and frequency resources reserved for communications by the UE; and
to transmit, by the UE, the UE transmissions within the set of time and frequency resources of the current COT,
wherein the UE transmissions and the COT-SI message are transmitted within the additional set of time and frequency reserved resources,
wherein the additional set of time and frequency reserved resources defines a shared resource region sharable by the UE and the one or more neighboring UEs and determined by a remaining set of time and frequency resources outside of the additional set of time and frequency reserved resources and within the set of time and frequency resources of the current COT.

20. The apparatus of claim 19, wherein the additional set of time and frequency reserved resources identifies one of:
a single resource region having continuous time resources and a plurality of frequency resources; or
a plurality of resource regions, wherein each resource region of the plurality of resource regions includes continuous time resources and a plurality of frequency resources and each subsequent resource region of the plurality of resource regions is located in one of: continuously in time or within a predetermined threshold time from a prior resource region of the plurality of resource regions.

21. The apparatus of claim 20, further including configuration of the at least one processor:
to determine, by the UE, additional transmissions to the UE transmissions;
to identify, by the UE, a next available resource within the current COT falling within the shared resource region; and
to perform, by the UE, an abbreviated LBT procedure to contend for access to the shared communication spectrum with the one or more neighboring UEs.

22. The apparatus of claim 20, further including configuration of the at least one processor:
to determine, by the UE, a modification to the UE transmissions;
to generate, by the UE, a new COT-SI message including a new set of time and frequency reserved resources within the set of time and frequency resources of the current COT that defines one or more new reserved resource regions and one or more new shared resource regions within the current COT; and to transmit, by the UE, the new COT-SI message to the one or more neighboring UEs via a new sidelink transmission.

23. The apparatus of claim 20 wherein the sidelink transmission via which the COT-SI message is transmitted includes one of:

an existing sidelink transmission to which the COT-SI message is added; or a dedicated sidelink transmission for the COT-SI message.

24. The apparatus of claim 20, further including configuration of the at least one processor:

to indentify, by the UE, within a first type sidelink control information message of up to two slots within the current COT reserved for transmission by the UE.

* * * * *